United States Patent [19]
O'Brien

[11] Patent Number: 5,196,122
[45] Date of Patent: Mar. 23, 1993

[54] EXTERNAL REGENERATION SYSTEM FOR MIXED BED ION EXCHANGERS

[75] Inventor: Michael J. O'Brien, Basking Ridge, N.J.

[73] Assignee: The Graver Company, Union, N.J.

[21] Appl. No.: 927,323

[22] Filed: Aug. 10, 1992

[51] Int. Cl.$^5$ .............................................. B01D 15/04
[52] U.S. Cl. .................................... 210/662; 210/673; 210/675; 210/670
[58] Field of Search ............... 210/660, 662, 670, 675, 210/676, 678, 673, 290

[56] References Cited

U.S. PATENT DOCUMENTS

| | | | |
|---|---|---|---|
| 2,666,741 | 1/1954 | McMullen | 210/24 |
| 3,382,169 | 5/1968 | Thompson | 210/673 |
| 3,385,787 | 5/1968 | Crits et al. | 210/673 |
| 3,414,508 | 12/1968 | Applebaum et al. | 210/673 |
| 3,429,807 | 2/1969 | Burgess | 210/675 |
| 3,537,989 | 11/1970 | Crits | 210/675 |
| 3,582,504 | 6/1971 | Salem et al. | 210/675 |
| 3,583,908 | 6/1971 | Crits | 210/673 |
| 3,617,558 | 11/1971 | Jones | 210/290 |
| 3,634,229 | 1/1972 | Stanley | 210/675 |
| 3,719,591 | 3/1973 | Crits | 210/675 |
| 3,826,761 | 7/1974 | Short | 210/675 |
| 4,120,786 | 10/1978 | Peterson et al. | 210/675 |
| 4,191,644 | 3/1980 | Lambo et al. | 210/675 |
| 4,264,439 | 4/1981 | Lefevre et al. | 210/675 |
| 4,298,696 | 11/1981 | Emmett | 210/675 |
| 4,369,114 | 1/1983 | Siegers | 210/675 |
| 4,388,417 | 6/1983 | Down et al. | 521/26 |
| 4,400,278 | 8/1983 | Martinola | 210/290 |
| 4,519,917 | 5/1985 | Martinola | 210/290 |

Primary Examiner—Stanley S. Silverman
Assistant Examiner—Cynthia L. Nessler
Attorney, Agent, or Firm—Dressler, Goldsmith, Shore, Sutker & Milnamow Ltd.

[57] ABSTRACT

A method for regenerating exhausted anion and cation exchange resins for service in an associated mixed bed demineralizer. The method utilizes a portion of the exhausted anion and cation resins to form buffer zones which reduce cross-contamination between the anion and cation resins during regeneration. Alternatively, a relatively inert material having a specific density intermediate to that of the anion and cation resins can be used to form the buffer zones. The materials which form the buffer zones remain in the regeneration system and are not returned to the service vessels with the regenerated resin. The method includes an improved technique for terminating the transfer of cation resin from a separation vessel.

12 Claims, 1 Drawing Sheet

EXTERNAL REGENERATION SYSTEM FOR MIXED BED ION EXCHANGERS

BACKGROUND OF THE INVENTION

The present invention relates to an improved method for regenerating the exhausted anion and cation exchange resins in a mixed bed demineralizer.

Mixed bed systems containing anion and cation exchange resins for the purification of water have many industrial applications. A primary application of such a system is in the purification of water for condensate recirculation systems used to drive steam turbines. It is essential that this water be of an extremely high purity level in order to avoid any adverse effects on the surfaces of turbine blades, boilers, pipes, etc. Since it is desired to produce water that is free of any residue upon evaporation, the cation exchange resin must be in the hydrogen or ammonium form, and the anion exchange resin must be in the hydroxide form. In any event, it is conventional to regenerate the cation exchange resin with a strong acid such as sulfuric or hydrochloric acid, and to regenerate the anion exchange resin with a strong base, generally sodium hydroxide It has heretofore been recognized that the in-situ regeneration of anion and cation exchange resins in the service vessel is not practical Therefore, it is necessary to transfer the resins from the service vessel to a specially designed regeneration system. There are various designs of external regeneration systems currently in use. One design regenerates both the cation and anion exchange resins in a single vessel. This type of system presents critical design problems to prevent the sodium hydroxide from contacting the cation resin and the sulfuric acid from contacting the anion exchange resin. Because of this design problem and certain operational problems the single vessel regeneration system has not found wide acceptance.

Another design is a two vessel regeneration system in which the anion and cation resins are transferred into a separation/cation regeneration vessel. The resins are backwashed with water to expand the bed and classify the resins into an upper anion exchange resin layer and a lower cation exchange resin layer. The anion resin is then removed to an anion regeneration vessel where it is cleaned and regenerated. The cation resin is cleaned and regenerated in the separation/cation regeneration vessel. This design requires the complete separation of the anion exchange resin and the cation exchange resin. Various techniques have been used to effect such separation, including those disclosed in U.S. Pat. No. 3,385,787 to Crits et al., U.S. Pat. No. 3,429,807 to Burgess, U.S. Pat. No. 3,582,504 to Salem et al., U.S. Pat. No. 3,634,229 to Stanley, Jr., U.S. Pat. No. 3,826,761 to Short and U.S. Pat. No. 4,120,786 to Petersen et al. Although the above techniques have improved the degree of separation of the anion resin and the cation resin, they have not achieved complete separation. In practice, the consequence of imperfect separation is that a small proportion of the cation resin is inevitably saturated by the anion resin regenerant and conversely a small proportion of the anion resin is saturated by the cation resin regenerant. Both of which reduces the level of performance when the resins are returned to service.

In an effort to reduce the mixing of the anion resin and the cation resin at the interface between the resins after the backwash separation, it has been suggested to provide an intermediate layer of inert resin material of specific density intermediate the specific densities of the anion and cation resins. One example of such a system is disclosed in U.S. Pat. No. 2,666,741 to McMullen. The system disclosed in this patent hydraulically separates the resins in the service vessel into an upper anion resin layer, an intermediate inert resin layer and a lower cation resin layer. The anion resin and the cation resin are regenerated by passing sodium hydroxide regenerant into the inert layer and upwardly through the anion resin and passing acid regenerant into the inert layer and downwardly through the cation resin. Although this system provides advantages over other systems which regenerate in the service vessel, it has not solved many of the problems inherent in the regeneration of the anion resin and the cation resin in the service vessel. The inert resin in the service vessel occupies space which can otherwise be occupied by additional anion and cation ion exchange resin. Accordingly, it is necessary to increase the size of the service vessel to make space for the inert resin.

In U.S. Pat. No. 4,264,439, a method is disclosed for separating a resin bed of a mixture of anion and cation exchange resins that utilizes a classifying fluid in the presence of an inert material. A conductivity property of the resin bed with the separation vessel is measured, with the conductivity property varying with the degree of separation and the position of the intermediate inert material layer. A plurality of conductivity sensors are positioned at different levels with respect to the separation vessel to determine the degree of separation and position of the anion and cation resins and the inert material.

The use of an intermediate density inert resin has also been heretofore disclosed in a two vessel regeneration system. Such a system is disclosed in U.S. Pat. No. 4,298,696 to Emmett. This system includes a separation/anion regeneration vessel and a cation regeneration vessel. The inert resin is mixed with the anion and cation resin in the service vessel. The resin from the service vessel is transferred into the separation/anion regeneration vessel wherein it is separated into an upper anion resin layer, an intermediate inert resin layer, and a lower cation resin layer. The cation resin layer is then hydraulically transferred to the cation regeneration vessel, leaving behind the anion resin and most of the inert resin. A conductivity sensor is used to determine the transition between the resins by detecting a decrease in the conductivity of the slurry in a transfer line as it passes out of the separation vessel. The anion resin is regenerated and rinsed in the separation/anion regeneration vessel and the cation resin is regenerated and rinsed in the cation regeneration vessel. The cation resin is then transferred back to the separation/anion regeneration vessel, wherein it is mixed with the anion resin and the inert resin and transferred back to a service vessel. This system also transfers the inert resin along with the anion and cation resin back into the service vessel and, thus, either results in reduced service capacity or requires an increase in the size of the service vessel. It should also be noted that the resin from each service vessel must include a quantity of inert resin. This system contemplates removal of any cation fines (heel) which are not separated out and transferred with the cation resin by the additional step of floating the anion resin in a saturated brine solution and removing the cation heel from the bottom of the separation/anion regeneration vessel.

In U.S. Pat. No. 4,388,417 to Down et al. a system is disclosed wherein the exhausted anion and cation resins from the service vessel is transferred to a separation/anion regeneration vessel which contains a quantity of inert resin of a specific density intermediate to the specific densities of the anion and cation resins. Following a sequence of wash, drain, and air scrub steps, the resins are backwashed from a bottom distributor to classify the resins into an upper anion resin layer, an intermediate inert resin layer, and a lower cation resin layer resting on an underdrain system. The cation resin layer is lifted from the underdrain as a slurry and then transferred from the separation/anion regeneration vessel into a cation regeneration vessel. Upon completion of the cation resin transfer, which is detected by a conductance probe located in a cation resin slurry transfer line, the separation/anion regeneration vessel is drained. Caustic soda of a concentration in the range of 10–18% is cycled through the separation-anion regeneration vessel, causing the anion resin to float and any traces of cation resin and the inert material to sink to the bottom of the vessel, leaving a layer of caustic soda in between. The floating anion resin is then transferred from the separation/anion regeneration vessel to an anion rinse vessel wherein it is suitably rinsed and held. The inert resin and the cation heel are obtained in the separation-/anion regeneration vessel awaiting the delivery of the next exhausted resin charge. The cation resin in the cation regeneration vessel is regenerated with sulfuric acid and rinsed in a conventional manner. The anion resin is then transferred from the anion rinse vessel to the cation regeneration vessel wherein it is air mixed with the cation resin and final rinsed, whereupon the mixed anion and cation resin is held awaiting transfer to a service vessel.

In U.S. Pat. No. 4,191,644 to Lembo et al. there is disclosed a system wherein the exhausted anion and cation resins are transferred to a separation vessel wherein they are stratified into an upper floating anion resin bed and a lower floating cation resin bed. The major portion of the upper floating bed is transferred via a side-mounted transfer nozzle to a separate vessel for regeneration with a suitable base. A second cut is then removed from the separation vessel via a second side nozzle located below the anion transfer nozzle, which cut encompasses the interface between the upper and lower beds. This second cut contains the remainder of the anion resin not removed as well as a small amount of cation resin. The second cut is transferred to another vessel wherein it is physically separated into cation and anion portions. The remainder of the stratified resin in the separation vessel allegedly consists of cation resin, but, in actuality, appears likely to include a portion of the anion resins which continued to rest on top of the cation resin. The remainder of the stratified resin is regenerated with a suitable acid either in the separation vessel or another vessel. After regeneration, the anion and cation resins are recombined for reuse in a service vessel. The cation portion of the interfacial cut may be combined with the cation resin of the third cut and the anion portion of the interfacial cut may be combined with the anion resin of the first cut.

There is a need for an improved method and apparatus for regenerating the exhausted anion and cation exchange resins in a mixed bed demineralizer that provides superior treatment performance and greater operational flexibility. It is important that the anion and cation exchange resins are accurately isolated to eliminate cross-contamination of the resins. Accordingly, there is a need to increase the resin separation efficiencies achieved by heretofore used regeneration systems.

SUMMARY OF THE INVENTION

The present invention provides a method for regenerating exhausted anion and cation resins which produces a more precise separation between the anion and cation resins when they are extracted from a separation vessel and, thereby, permits higher efficiency operation when the resins have been returned to a mixed bed demineralizer. To minimize contamination of an anion regeneration vessel by the cation resin, the method provides for terminating a transfer of anion resin from the separation vessel well before an interface with the cation resin is disturbed. A buffer zone of exhausted anion resin or, alternatively, an inert material remains in contact with the cation resin to guard against such a disturbance. Similarly, a transfer of cation resin is terminated short of the cation boundary interface based upon a signal from a sensor which detects the progress of the interface through the separation vessel.

In one aspect of the present invention, the method comprises transferring spent anion and cation resins into a separation vessel which has previously been charged with a small quantity of relatively exhausted anion and cation resin from a previous regeneration cycle. Backwash liquid is passed upflow through the separation vessel in a manner that expands a multicomponent bed composed of resins, segregating particles of the bed by specific density and creating distinct layers. The least dense layer is an anion resin layer which comes to rest in an upper portion of the classified bed. The anion resin has a specific density which is less than that of the cation resin. Accordingly, the anion resin is classified into a separate layer located above a cation resin layer. The cation resin layer contains the denser particles of the classified bed and concentrates at a lower portion of the bed.

A side-mounted transfer nozzle is utilized to transfer some of the anion resin from the anion resin layer of the classified bed, leaving behind as a buffer zone the balance of the anion resin layer which effectively prevents the cation resin layer from being transported during the anion resin transfer. The anion resin is transported as a slurry to an anion regeneration vessel where the anion resin is regenerated and rinsed.

Substantially all of the cation resin remains in the separation vessel with the buffer zone of anion resin after the transfer to the anion regeneration vessel. The cation resin is subsequently transferred from the bottom of the separation vessel to a cation regeneration vessel. A detector capable of detecting an interface between the anion resin layer and the backwash liquid is positioned at a predetermined elevation on the separation vessel to determine when the cation resin transfer should be terminated.

The detector transmits a signal as the solid-liquid interface at the top of the classified bed descends to the predetermined elevation, causing valves to close and stop the transfer of the cation resin. The predetermined elevation is chosen so that a significant portion of the cation resin layer remains in the separation vessel to minimize the possibility of transferring anion resin to the cation regeneration vessel. The cation is regenerated and rinsed in the cation regeneration vessel.

In another aspect of the present invention, the method employs an inert material of intermediate specific density. Substantially all of the relatively less dense anion resin layer is transferred from a separation vessel while a significant quantity of the inert material remains in the separation vessel as a buffer zone. Subsequently, a transfer of a cation resin layer from the separation vessel terminates upon detection of an interface between the inert material and a backwash liquid at a predetermined elevation in the separation vessel. The predetermined elevation is chosen to permit transfer of substantially all of the cation resin to a cation regeneration vessel, while leaving a significant quantity of the inert material to remain in the separation vessel as a buffer zone which protects against transfer of any residual anion resin to the cation regeneration vessel.

DESCRIPTION OF THE DRAWING

The FIGURE is a schematic representation of a regeneration station in which preferred embodiments of the present invention may be employed.

DESCRIPTION OF THE PREFERRED EMBODIMENTS

Figure 1:
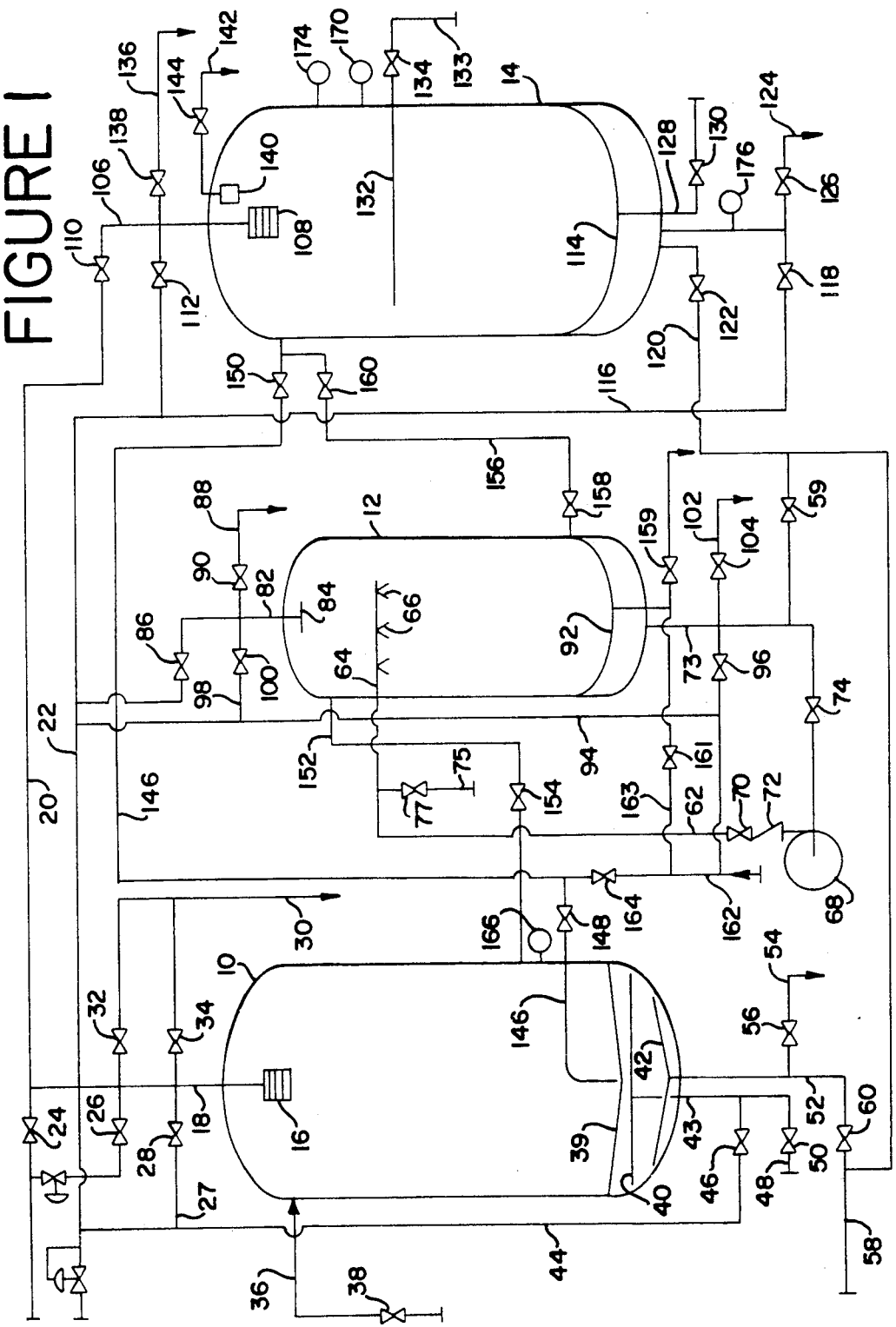

Regeneration methods in accordance with the present invention are hereinbelow disclosed in conjunction with a regeneration station apparatus schematically represented in the FIGURE. It will be readily realized by one skilled in the art that the regeneration methods of the present invention may be utilized with alternative regeneration station apparatus. Accordingly, the disclosure of a specific regeneration station is for exemplary purposes only, and not to indicate a limitation as to the scope of the invention.

Referring to the FIGURE, a regeneration station is disclosed which includes a separation vessel 10, an anion regeneration vessel 12, and a cation regeneration vessel 14. Separation vessel 10 has an upper distributor and strainer assembly 16 in communication with an upper inlet/outlet line 18. Line 18 is in communication with an air supply line 20, associated with an air supply source (not shown). A regenerated water supply line 22 is associated with a regenerated water supply source (not shown) and an open drain line 30. Air supply line 20 is controlled by air inlet valves 24 and 26. A rinse water supply line 27 is controlled by a rinse inlet valve 28. Drain line 30 is controlled by backwash outlet valves 32 and 34. A resin inlet line 36 enters an upper portion of vessel 10 and is controlled by a resin transfer valve 38. Vessel 10 has an underdrain system which includes a barrier 39 permitting the passage of liquid therethrough while retaining ion exchange resins thereon. Below barrier 39 is a wash water distributor 40. A lower inlet line 43 connects distributor 40 to line 22 through a backwash line 44 controlled by a backwash inlet valve 46. A conveying water inlet/outlet line 48, associated with a source of conveying water (not shown), is connected to lower inlet line 43 and is controlled by a motive water inlet valve 50. A lower inlet/outlet line 52, which extends downwardly from collector 42, is connected to a drain line 54, which is controlled by a drain valve 56. An air supply line 58, associated with an air supply source (not shown), is controlled by an air inlet valve 60 and is in communication with line 52.

The anion regeneration vessel 12 has an upper inlet/outlet line 82, which is in communication with a top distributor 84 positioned therein. Line 82 is in communication with regeneration water supply line 22 through control valve 86 and an open drain line 88 through control valve 90. A rinse water supply line 98 is controlled by a top rinse inlet valve 100. Vessel 12 has a dish plate barrier 92, with suitable strainers associated therewith (not shown), to permit the passage of liquid therethrough while retaining ion exchange resins thereon. A backwash water line 94, controlled by bottom backwash inlet valve 96, communicates with line 73 which enters the bottom of vessel 12. Line 94 is also in communication with line 22. A drain line 102 is provided in communication with backwash line 73 and is controlled by drain valve 104. A caustic supply line 75, associated with a caustic supply source (not shown), is in communication with distributor 64 and is controlled by chemical inlet valve 77.

A regenerant recirculation line 62 is provided to recirculate caustic regenerant received from vessel 12 through a mid-level distributor 64 within vessel 12. Distributor 64 preferably has nozzles 66 associated therewith to increase the velocity of the recycled regenerant. Line 62 has a recycle pump 68, a chemical inlet valve 70, a non-return valve 72, and an isolation valve 74 associated therewith.

The cation regeneration vessel 14 has an upper inlet/outlet line 106, which is in communication with an upper distributor and strainer assembly 108. Line 106 is in communication with air supply line 20 through air inlet control valve 110 and water supply line 22 through top rinse inlet valve 112. A dish plate barrier 114, with suitable strainers associated therewith (not shown), is provided in vessel 14 to permit the passage of liquid therethrough while retaining ion exchange resins thereon. A backwash water supply line 116, having a bottom backwash inlet control valve 118 associated therewith, is in communication with water supply line 22 and the bottom of vessel 14. An air inlet line 120, controlled by a bottom air inlet valve 122, extends between air supply line 58 and the bottom of vessel 14. A drain line 124, controlled by a drain valve 126 associated therewith, is provided in communication with the bottom of vessel 14. A resin outlet transfer line 128 communicates with the interior of vessel 14 above barrier 114 at its lowermost point and is controlled by a resin outlet valve 130. A mid-level acid regenerant distributor 132 is provided in vessel 14 in communication with a source of acid regenerant (not shown) through acid supply line 133, which is controlled by a chemical inlet valve 134. Vessel 14 has a drain line 136, controlled by a backwash outlet valve 138, in communication with line 106. A vent and strainer assembly 140 is provided in communication with a vent line 142 through a vent valve 144.

A cation resin transfer line 146 is provided having one end in communication with the interior of vessel 10, a short distance above the lowermost point of barrier 39, and the other end in communication with an upper portion of vessel 14. The flow through transfer line 146 is controlled by resin transfer valves 148 and 150. An anion transfer line 152 is in flow communication with a nozzle mounted in the side of vessel 10 and extends between vessels 10 and 12. Line 52 is controlled by a resin transfer valve 154. A resin transfer line 156 extends between barrier 91 in vessel 12 and an upper portion of vessel 14. The flow through transfer line 156 is controlled by resin transfer valves 158 and 160. A flush line 162 connected to a source of water (not shown), communicates with transfer line 146 between valves 148 and 150 and is controlled by a flush valve 164. Line 162 is also in communication with line 94 on the support side of valve 164. Various level switches and conductivity cells are provided in the vessels and lines which will be disclosed in the discussion of the method of the present invention which hereinbelow follows.

Preferred methods of regenerating exhausted anion and cation exchange resins in accordance with the present invention will now be described in a sequence of operations using the regeneration station disclosed in the FIGURE. At the start of the regeneration cycle, vessel 10 contains a charge of relatively inert material having a specific density greater than the specific density of the anion resin to be regenerated, but less than the specific density of the cation resin. A sufficient quantity of inert material is present in vessel 10 to form a substantially pure layer between the anion layer and the cation layer after the classification thereof, in a manner which will be hereinbelow described An example of such a diffuse inert material is Ambersep Inert ®, which is manufactured by Rohm and Haas Company. Most preferably, rather than the charge of relatively diffuse inert material, the vessel 10 may contain a small quantity of exhausted anion and cation resins from a previous regeneration cycle.

Vessels 12 and 14 are empty at the start of the regeneration cycle. During each of the operative steps which are hereinbelow described, it shall be assumed that all of the valves are closed except those which are specifically recited as being open. The flow control valves each permit a flow determined by the operative steps being performed.

To begin a regeneration cycle, valves 34 and 38 are opened and exhausted anion and cation resin is fluidized and transferred from the service vessels of a mixed bed demineralizer into vessel 10 through line 36. A bed forms within vessel 10, constituted by the anion and cation resins which have most recently entered the separation vessel and, also, by a small amount of anion and cation resins which remain in the separation vessel from a previous transfer.

The bed is backwashed and classified to remove dirt particles from the bed, and to segregate the bed into layers, by opening valves 46 and 32. The backwash water flows up from distributor 40 through the bed and out lines 18 and 30 to drain. The water flow is continued for a sufficient time to classify the bed into an upper anion resin layer and a lower cation resin layer.

Subsequently, an upper portion of the anion resin layer is withdrawn through the line 152 and a lower portion of the anion layer is left undisturbed. The transferring of the anion resin is accomplished by opening valves 28, 154, and 90.

Line 152 is fitted with a nozzle mounted in a sidewall of vessel 10. The nozzle is located at a predetermined elevation calculated to remove substantially all of the anion resin from vessel 10, while leaving a significant portion of the anion resin layer in vessel 10 to act as a buffer zone. The buffer zone prevents cross contamination between the anion resin which is to be regenerated in vessel 12 and the cation resin. Typically, the depth of the anion resin layer remaining in vessel 10 after the transfer of anion resin is in the range of about 6 to about 10 inches.

Similarly, only a lower portion of the cation resin layer is transferred while an upper portion of the cation resin layer remains as a buffer zone in vessel 10. This is accomplished by opening valves 50, 148, 150, 138 and 126. Motive water enters the lower end of vessel 10 through lines 48 and 43 and distributor 40. The motive water carries the cation resin from the bottom of vessel 10 through transfer line 146 into vessel 14.

In accordance with the preferred embodiment shown in the FIGURE, a solid-liquid interface detector 166 is located in a sidewall of vessel 10 at a predetermined elevation to detect a solid-liquid interface in the vessel 10. The cation transfer step continues to withdraw cation resin from the lower end of the bed until the detector 166 senses the top of the bed at the predetermined elevation within the separation vessel 10 and sends a signal to terminate the resin transfer. Following termination of the cation resin transfer, the transfer line 146 is sequentially flushed to the cation resin vessel 14 by opening valves 162 and 150, and to the separation vessel 10, utilizing valves 162 and 148.

The detector 166 can be any device capable of detecting a solid-liquid interface and transmitting a signal, such as a capacitance, ultrasonic, infrared, or conductance device. Generally, the solid-liquid interface is a discontinuity between the backwash liquid and the anion resin or the inert material. The interface is typically located at a free surface which delineates the top of the bed of particulate, and moves progressively downward in the separation vessel as constituents of the bed are transferred to other vessels.

An infrared probe is presently preferred. The detector 166 is positioned to leave a buffer zone of the cation resin as described above. The buffer zone serves as additional protection against cross-contamination of the anion and cation resins.

At this point, vessel 12 contains substantially pure anion resin and, in some instances, a small amount of cation resin in the form of powder or fragmented beads. Vessel 14 contains substantially pure cation resin. The next series of operative steps are intended to prepare the anion resin in vessel 12 and the cation resin in vessel 14 ready for regeneration.

In vessel 12, the water level is drained down to a level just above the bed level. This draining step is accomplished by opening valves 90 and 104. The anion resin bed in vessel 12 is then air scoured in a conventional manner by opening valves 59 and 90, providing air flow through line 73 into vessel 12 and out through line 88. Upon completion of the air scour, the bed is permitted to settle for a short period of time and backwashed by opening valves 90 and 96 to remove dirt particles from the bed. The anion resin bed in vessel 12 is now ready for regeneration.

The cation resin bed in vessel 14 is similarly readied for regeneration. Vessel 14 is drained down to a level a short distance above the bed by opening valves 126 and 138 and drained until the level in vessel 14 reaches level switch 170. The cation resin bed is then scoured by opening valves 122 and 138 in a conventional manner. The cation resin bed is permitted to settle and it is then backwashed to remove dirt particles therefrom by opening valves 118 and 138. The cation bed in vessel 14 is now ready for regeneration.

The anion resin is regenerated in vessel 12 through the following sequence of operational steps. Vessel 12 is drained down to a level at the bottom of the bed by opening valves 90 and 104. Caustic soda (sodium hydroxide) having a concentration in the range of 10–18% is introduced through line 75 and distributor 64 into vessel 12 by opening valves 77 and 104. The caustic flows through vessel 12 and out drain 104. The relatively high density of the caustic causes the anion resin to float while any traces of the cation resin (e.g., whole beads, fines, or broken pieces) sink to the bottom of vessel 12, leaving a clear layer of caustic soda in between. In order to improve the removal of entrained cation resin, the caustic soda is recycled externally of vessel 12 and pumped back to the caustic distributor 64. This step introduces turbulence into the floating anion resin layer. The recycle of caustic is initiated by opening valves 70 and 74 and turning on recirculation pump 68. The cation resin, especially when in fine particle form, may be drained for disposal through valve 159.

The cation resin in vessel 1 is regenerated at the same time that the anion resin is being regenerated in vessel 12. The cation resin in vessel 14 is regenerated in a convention manner by passing an acid regenerant (i.e., 10% sulfuric acid) through the resin bed by opening valves 134 and 126. The regenerant acid enters vessel 14 through distributor 132 and exits through drain line 124.

The regenerated cation resin in vessel 14 is rinsed in a conventional manner. Upon completion of the regenerating and rinsing, the anion resin bed in vessel 12 is transferred to vessel 14. This is accomplished by opening valves 86, 96, 158, 160, 138 and 126 to initiate a slurry transfer of the anion resin bed through line 156 from the bottom of vessel 12. The anion resin take-off nozzle is so designed as to leave a buffer layer of anion resin between the take-off nozzle and any cation fines in the bottom of vessel 12. The bulk of the anion resin is joined with the cation resin in vessel 14. The liquid level in vessel 14 is then partially drained down to the level of level switch 174 by opening valves 138 and 126. The resin bed in vessel 14 is air mixed in a conventional manner by opening valves 122 and 138 and starting a blower motor associated with line 58.

Vessel 14 is drained down and the resin bed is then subjected to a slow refill step and a fast refill step by suitably opening valves 112 and 144. The mixed anion and cation resin bed is then final rinsed by opening valves 112 and 126. The rinse water enters through line 106 and exits through dish plate 114 and drain line 124. The final rinse step is continued until the conductivity of the rinse water passing through outlet line 124 is approximately 0.5 micromhos as measured by conductivity probe 176 in line 124. The regenerated bed of mixed cation and anion resin can be kept on stand-by in vessel 14, from where it can be transferred to a service vessel following transfer of the next exhausted charge to vessel 12. Alternatively, the resin bed can be transferred from vessel 14 to a storage vessel where it can be held until required to be transferred to a service vessel.

At such time as the anion and cation resin is being air mixed and rinsed in vessel 14, the portion of the anion resin layer which was retained in the anion regeneration vessel 12 is returned by opening valves 161, 164, 86, 34, and 56. The anion resin and the cation resin, now relatively inactive, are retained in vessel 10 awaiting the arrival of the next exhausted charge of anion and cation resin.

In accordance with another embodiment of the invention, the vessel 10 may contain a quantity of inert material that has a specific density intermediate to the specific densities of the anion and cation resins. An example of such an inert material is Ambersep Inert ®, which is manufactured by Rohm and Haas Company. Upon backwashing of the resins in vessel 10, the resins are classified into an upper anion resin layer, an intermediate inert material layer and a lower cation resin layer. Substantially all of the anion resin and a small portion of the inert material layer in vessel 10 are withdrawn as a slurry through line 152. A significant portion of the anion resin layer remains in the separation vessel 10 to act as a buffer zone.

For terminating the transfer of cation resin to a cation regeneration vessel 14, a solid-liquid interface detector 166 adapted to sense a discontinuity between the inert material and a backwash liquid is employed. The detector 166 is positioned at a predetermined elevation calculated to allow transfer of substantially all of the cation resin layer from vessel 10, while permitting a quantity of the inert material to remain as a buffer zone for reducing cross-contamination.

The method of regenerating anion and cation resins in accordance with the hereinabove described procedure utilizes a solid-liquid interface detector mounted directly on a separation vessel to reduce cross-contamination of the cation resin with the anion resin and the anion resin with the cation resin during the regeneration. Therefore, the method enables a higher quality treated water to be obtained in both the H/OH and NH4/OH cycles. Additionally, the method does not encroach on the quantity of resins in active service in the demineralizer because the additional anion and cation resins or, alternatively, the inert material, are retained in the separation vessel and are not returned to the service vessels of the demineralizer.

Obvious modifications of the aforementioned method will occur to those skilled in the art. It is intended by the appended claims to cover all such modifications coming within the proper scope of the invention.

What is claimed is:

1. A method for regenerating a mixture of anion and cation resins from a mixed bed demineralizer, comprising the steps of:
    transferring exhausted anion and cation resins into a separation vessel containing a small quantity of anion and cation resins from a previous transfer;
    directing a backwash liquid upward through the separation vessel so as to separate the resins into an upper anion resin layer and a lower cation resin layer;
    transferring an upper portion of the anion resin layer from the separation vessel to an anion regeneration vessel, leaving a lower portion of the anion resin layer and substantially all of the cation resin in the separation vessel;
    passing a regenerant liquid through the anion regeneration vessel to regenerate the anion resin;
    transferring a lower portion of the cation resin layer from the separation vessel to a cation regeneration vessel;
    detecting an interface between the anion resin and the backwash liquid at a predetermined elevation in the separation vessel;
    terminating the transfer of the cation resin layer upon detection of the interface at the predetermined level, leaving an upper portion of the cation resin layer and the lower portion of the anion resin layer in the separation vessel; and
    passing a regenerant liquid through the cation regeneration vessel to regenerate the cation resin.

2. The method of claim 1 wherein the transferring of the upper portion of the anion resin layer from the separation vessel includes passing the anion resin through a side-mounted nozzle located on the separation vessel.

3. The method of claim 1 wherein the detecting of the interface includes sensing a change in infrared radiation transmittance within the separation vessel.

4. The method of claim 1 which further comprises the steps of floating the anion resin in the regenerant liquid in the anion regeneration vessel and removing cation resin in the form of fragmented beads or fine particulate from the bottom of the anion regeneration vessel.

5. The method of claim 1 which further comprises altering a cation resin to anion resin volume ratio in an associated mixed bed demineralizer by varying the location of the predetermined elevation relative to the separation vessel.

6. The method of claim 1 wherein the lower portion of the anion resin layer remaining in the separation vessel after the transferring of the upper portion of the anion resin layer has a depth which is in the range of about 6 to about 10 inches.

7. A method for regenerating a mixture of anion and cation exchange resins from a mixed bed demineralizer, comprising the steps of:
- transferring exhausted anion and cation resins into a separation vessel containing a small quantity of a relatively inert material of a specific density intermediate to the specific density of the anion resin and the specific density of the cation resin;
- directing a backwash liquid upward through the separation vessel so as to separate the resins and the inert material into an upper anion resin layer, an intermediate inert material layer, and a lower cation resin layer;
- transferring the anion resin layer from the separation vessel to an anion regeneration vessel, leaving a significant amount of the inert material and substantially all of the cation resin layer in the separation vessel;
- passing a regenerant liquid through the anion regeneration vessel to regenerate the anion resin;
- transferring the cation resin layer from the separation vessel to a cation regeneration vessel;
- detecting an interface between the inert material and the backwash liquid at a predetermined elevation in the separation vessel;
- terminating the transfer of the cation resin layer upon detection of the interface at the predetermined level, leaving a significant amount of the inert material in the separation vessel; and
- passing a regenerant liquid through the cation regeneration vessel to regenerate the cation resin.

8. The method of claim 7 wherein the transferring of the anion resin from the separation vessel includes passing the anion resin through a side-mounted nozzle located on the separation vessel.

9. The method of claim 7 wherein the detecting of the interface includes sensing a change in infrared radiation transmittance within the separation vessel.

10. The method of claim 7 which further comprises the steps of floating the anion resin in the regenerant liquid in the anion regeneration vessel and removing cation resin in the form of fragmented beads or fine particulate from the bottom of the anion regeneration vessel.

11. The method of claim 7 which further comprises the steps of altering a anion resin to cation resin volume ratio in an associated mixed bed demineralizer by varying the location of the predetermined elevation relative to the separation vessel.

12. The method of claim 7 wherein the inert material remaining in the separation vessel after the transferring of the anion resin layer has a depth which is in the range of about 6 to about 10 inches.

* * * * *